2,798,838
Patented July 9, 1957

2,798,838

METHOD OF PREPARING ACETOPHENETIDIN TABLETS

Manford J. Robinson, Moorestown, N. J., assignor to Smith, Kline & French Laboratories, Philadelphia, Pa., a corporation of Pennsylvania No Drawing. Application November 10, 1954, Serial No. 468,165

17 Claims. (Cl. 167—82)

This invention relates to the method of preparing comminuted material for use in tableting and the product of the method.

In connection with forming pharmaceutical tablets containing, for example, acetophenetidin, acetanilid, procaine penicillin, methenamine or sodium phenobarbital, difficulties are encountered. The greatest difficulty is capping, which is the splitting off of a portion of the top or bottom part of a tablet. Capping, when tableting the above mentioned materials, causes a high percentage of rejects and the considerable expense of reprocessing of the rejects.

A second difficulty for example, occurs when material such as acetophenetidin, acetanilid, and sodium phenobarbital are wet granulated in order to be tableted. This is an embarrassment when it is desired to combine these materials before tableting with other materials which are adversely affected such as, for example, decomposed by contact with the granulating solution. By way of specific example, when acetophenetidin is combined with aspirin, the aqueous granulating solution used in connection with the acetophenetidin results in decomposition of aspirin.

In accordance with this invention, capping, when tableting is eliminated. Further, this invention permits compression per se or granulation by the precompression procedure after processing in accordance with this invention where it could not be accomplished heretofore. Further, comminuted materials, after being processed in accordance with this invention, can also be granulated using the conventional wet granulation procedure if desired and without resultant capping on being tableted.

The method of this invention comprises suspending the material being treated, for example, acetophenetidin, acetanilid, procaine penicillin, methenamine or sodium phenobarbital in comminuted form in a volatile solution of a coating material. This suspension is then spray dried to form dry treated particles substantially coated with the coating material.

The material being treated will have a particle size not larger than about 60 mesh (U. S.), although any size particle smaller than about 60 mesh (U. S.) is satisfactory, it is preferred to have the particles of the material being treated in the range of from about 5 microns to about 40 microns. The material being treated will be from about 5% to about 75% and preferably from about 20% to about 50% by weight of the volume of the suspension which is spray dried, the weight being measured in grams and the volume being measured in cubic centimeters. Where, hereinafter, the conventional pharmaceutical usage of weight to volume, which can also be expressed as w./v., is used, the weight will be measured in grams and the volume in cubic centimeters.

The coating material will be a cellulose ester, a natural gum, a gum constituent of a natural gum, or a proteinaceous material such as casein, gelatin and zein. The term natural gum as used herein in the description and claims is intended to include natural gums as such and gum constituents thereof. Exemplary of cellulose esters are a lower alkyl cellulose, such as, for example, methyl or ethyl cellulose; carboxy lower alkyl cellulose, such as, for example, carboxy methyl cellulose, a hydroxy lower alkyl cellulose, such as, for example, hydroxy methyl cellulose or hydroxy ethyl cellulose; cellulose esters formed with organic acids, such as, for example, cellulose acetate hydrogen phthalate, ammonium cellulose acetate phthalate, cellulose acetate butyrate, cellulose acetate sodium phthalate and cellulose acetate potassium phthalate; and an alkali metal salt of a cellulose ester formed with an inorganic acid, such as, for example, sodium cellulose sulfate and potassium cellulose sulfate.

Exemplary of natural gums and gum constituents thereof are acacia, tragacanth, karaya, sodium alginate, agar, chondrus, arabic acid, bassorin, carrageenin and pectin. The solvent for the coating material may be, for example, water, a ketone, such as, for example, acetone or methyl ethyl ketone, a lower alcohol, such as, for example, methyl, ethyl or isopropyl alcohol, ether, diethyl ether, benzene, toluene, xylene, carbon tetrachloride or chloroform. Where a gum is used, water is the preferred solvent.

In the suspension which is to be spray dried, the coating material will be present in an amount of from about 0.5% to about 30% and preferably from about 5% to about 20% by weight of the volume and the material to be treated will be present in an amount of from about 5% to about 75% and preferably from about 20% to about 50% by weight of the volume.

The spray drying will be carried out in apparatus conventionally used for spray drying and which is well known to the art. The spray drying conditions may vary within wide ranges. It is, however, preferred to use a minimum initial (inlet) temperature of about 50° C. and a maximum terminal (outlet) temperature of about 150° C.

The product of the thus outlined process comprises dry particles of, for example, acetophenetidin, acetanilid, procaine penicillin, methenamine or sodium phenobarbital having a dry coat of one of the above mentioned coating materials over a substantial portion of its surface. As indicated above, the particles including the coating are not larger than about 60 mesh (U. S.) in size and preferably are from about 40 to about 5 microns in size. The coating material in the finished product is from about 1% to about 25% and preferably from about 5% to about 15% by weight of the material which is coated.

The finished product may now be tableted using a number of different techniques. It can, where desired, be directly compressed into tablet form, alone, or in a mixture with other ingredients, such as, for example, medicaments or fillers, using a conventional tableting machine. If desired, the product of this invention can be granulated by the precompression technique, that is, by compressing the material and then comminuting it to the desired size. It can then be tableted, alone, or in a mixture with other conventional tableting ingredients. Again, where wet granulation is not undesirable, the product of this invention can be mixed with a granulating solution, such as, for example, aqueous gelatin solution and granulated by passing through a screen. The thus formed granule can then be tableted, alone, or in mixture with other tableting ingredients as desired. The invention will be further clarified by the following specific examples.

Example 1

| | | |
|---|---|---|
| Acetophenetidin (325 mesh) | gm | 200.0 |
| Acacia | gm | 50.0 |
| Distilled water | cc | 1,000.0 |

The acacia was dissolved in water with the aid of heat. The acetophenetidin was then added to the water with stirring until it was well suspended. The suspension was strained through a #100 mesh screen and then spray dried with an inlet temperature of 195° C. and an outlet temperature of 86° C. 238.0 gm. solids were collected.

*Example 2*

Acetophenetidin (325 mesh) _____gm__ 150.0
Aqueous ammonium cellulose acetate phthalate
   solution (2.5%) _____cc__ 500.0

150 gm. of the acetophenetidin was dispersed in the ammonium cellulose acetate phthalate solution. The suspension was passed through a #100 mesh screen and spray dried with an inlet temperature of 185° C. and an outlet temperature of 90° C. 124.0 gm. solids were collected.

*Example 3*

Acetophenetidin (325 mesh) _____gm__ 120.0
Methylcellulose _____gm__ 6.0
Distilled water _____cc__ 200.0

The methylcellulose was added to 100 cc. of boiling water. Ice formed from 100 cc. of water was added and the mass stirred until solution was complete. 120.0 gm. of the acetophenetidin was added and dispersed in the methylcellulose solution by stirring. The suspension was strained through a #100 mesh screen, heated to 50° C. and then spray dried with an inlet temperature of 188° C. and an outlet temperature of 92° C. 46.0 gm. solids were collected. 23.0 gm. of the thus formed solids were compressed into 2.5 gr. tablets using a conventional automatic tableting machine. The remaining 23.0 gm. of solids were mixed with an equal amount of aspirin and 5 gm. of starch, precompressed, comminuted into granules, mixed with .5 gm. talc and then formed into 5 gr. tablets using a conventional automatic tableting machine.

*Example 4*

Acetanilid (325 mesh) _____gm__ 150.0
Aqueous cellulose acetate hydrogen phthalate
   solution (2.5%) _____cc__ 500.0

150 gm. of the acetanilid was dispersed in the cellulose acetate hydrogen phthalate solution. The suspension was passed through a #100 mesh screen and spray dried with an inlet temperature of 185° C. and an outlet temperature of 90° C. 124.0 gm. solids were collected.

It is not desired to be limited except as set forth in the following claims.

What is claimed is:

1. The method of making an acetophenetidin tablet which comprises suspending acetophenetidin in a volatile solution of a coating material selected from the group consisting of cellulose esters, a natural gum and a proteinaceous material, the acetophenetidin being from about 5% to about 75% w./v. and the coating material being about 0.5% to about 30% w./v., the weights being measured in grams and the volume in cubic centimeters, spray drying the formed suspension to form dry particles of the acetophenetidin substantially coated with said coating material, and compressing said particles into a tablet.

2. The method of making an acetophenetidin tablet which comprises suspending acetophenetidin in a volatile solution of a coating material comprising a cellulose ester, the acetophenetidin being from about 5% to about 75% w./v. and the coating material being about 0.5% to about 30% w./v., the weights being measured in grams and the volume in cubic centimeters, spray drying the formed suspension to form dry particles of the acetophenetidin substantially coated with said coating material, and compressing said particles into a tablet.

3. The method in accordance with claim 2 characterized in that the cellulose ester is methylcellulose.

4. The method in accordance with claim 2 characterized in that the cellulose ester is carboxymethylcellulose.

5. The method in accordance with claim 2 characterized in that the cellulose ester is hydroxymethylcellulose.

6. The method in accordance with claim 2 characterized in that the cellulose ester is cellulose acetate hydrogen phthalate.

7. The method of making an acetophenetidin tablet which comprises suspending acetophenetidin in a volatile solution of a coating material comprising a natural gum, the acetophenetidin being from about 5% to about 75% w./v. and the coating material being about 0.5% to about 30% w./v., the weights being measured in grams and the volume in cubic centimeters, spray drying the formed suspension to form dry particles of the acetophenetidin substantially coated with said coating material, and compressing said particles into a tablet.

8. The method in accordance with claim 7 characterized in that the natural gum is acacia.

9. The method of making an acetophenetidin tablet which comprises suspending acetophenetidin in a volatile solution of a coating material comprising a proteinaceous material, the acetophenetidin being from about 5% to about 75% w./v. and the coating material being about 0.5% to about 30% w./v., the weights being measured in grams and the volume in cubic centimeters, spray drying the formed suspension to form dry particles of the acetophenetidin substantially coated with said coating material, and compressing said particles into a tablet.

10. The method in accordance with claim 9 characterized in that the proteinaceous material is zein.

11. An acetophenetidin tablet made in accordance with the process of claim 1, further characterized as comprising particles exclusive of coatings not in excess of 60 mesh, each particle being substantially coated with a coating material selected from the group consisting of cellulose esters, a natural gum and a proteinaceous material, said coating being from about 1% to about 25% by weight of the particles.

12. An acetophenetidin tablet in accordance with claim 11 characterized in that the cellulose ester is methylcellulose.

13. An acetophenetidin tablet in accordance with claim 11 characterized in that the cellulose ester is carboxymethylcellulose.

14. An acetophenetidin tablet in accordance with claim 11 characterized in that the cellulose ester is hydroxymethylcellulose.

15. An acetophenetidin tablet in accordance with claim 11 characterized in that the cellulose ester is cellulose acetate hydrogen phthalate.

16. An acetophenetidin tablet in accordance with claim 11 characterized in that the natural gum is acacia.

17. An acetophenetidin tablet in accordance with claim 11 characterized in that the proteinaceous material is zein.

References Cited in the file of this patent

UNITED STATES PATENTS

| | | |
|---|---|---|
| 2,317,479 | Peebles et al. | Apr. 27, 1943 |
| 2,484,637 | Mattocks et al. | Oct. 11, 1949 |
| 2,553,806 | Bogin et al. | May 22, 1951 |
| 2,566,200 | Hickey | Aug. 28, 1951 |
| 2,579,944 | Marshall | Dec. 25, 1951 |

OTHER REFERENCES

J. A. P. A., Sci. Ed., vol. 39, August 1950, pp. 444–450.
U. S. Dispensatory, 24th Ed., J. P. Lippincott, 1947, pp. 14 and 15.